United States Patent [19]

Chen et al.

[11] Patent Number: 5,111,481
[45] Date of Patent: May 5, 1992

[54] DUAL MODE LMS CHANNEL EQUALIZER

[75] Inventors: Walter Y. Chen, Brookside, N.J.; Richard A. Haddad, Tuxedo, N.Y.

[73] Assignee: Nynex Corporation, White Plains, N.Y.

[21] Appl. No.: 438,733

[22] Filed: Nov. 17, 1989

[51] Int. Cl.$^5$ .......................... H04B 3/04; H04B 3/14
[52] U.S. Cl. ........................ 375/14; 375/12; 375/99; 375/103; 333/28 R
[58] Field of Search ............... 375/11, 13, 14, 99, 375/103, 12; 333/28 R, 18

[56] References Cited

U.S. PATENT DOCUMENTS

| | | | |
|---|---|---|---|
| 4,701,936 | 10/1987 | Clark et al. | 375/14 |
| 4,727,543 | 2/1988 | Baver | 375/14 |
| 4,800,573 | 1/1989 | Cupo | 375/14 |
| 4,864,590 | 9/1989 | Arnor et al. | 375/14 |
| 4,866,736 | 9/1989 | Bergmans | 375/14 |
| 4,972,433 | 11/1990 | Yamaguchi et al. | 375/12 |
| 4,977,591 | 12/1990 | Chen et al. | 379/410 |

OTHER PUBLICATIONS

R. W. Lucky, "Automatic Equalization For Digital Communication", Bell System Technical Journal, vol. 44, No. 4, pp. 547-588, April 1965.
B. Mulgrew and C. F. N. Cowan, "An Adaptive Kalman Equalizer: Structure and Performance", IEEE Transactions on Acoustics, Speech and Signal Processing, vol. ASSP-35, No. 12, pp. 1722-1735, December 1987.
C. A. Belfiore and J. H. Park, Jr., "Decision Feedback Equalization", Proceedings of the IEEE, vol. 67, No. 8, pp. 1143-1156, August 1979.
K. Abend and B. O. Fritchamn, "Statistical Detection For Communication Channels With Intersymbol Interference", Proceedings of the IEEE, vol. 58, No. 5, pp. 779-785, May 1970.
John Cioffit and Thomas Kailath, "Fast Recursive-Least-Squares Transversal Filters for Adaptive Filtering", IEEE Trans. on Acoust., Speech and Signal Processing, vol. ASSP-32, No. 2, April 1984, pp. 304-337.

Primary Examiner—Douglas W. Olms
Assistant Examiner—Ralph Smith
Attorney, Agent, or Firm—Loren C. Swingle; Kenneth Rubenstein

[57] ABSTRACT

A dual mode LMS channel equalizer is disclosed. The inventive channel equalizer utilizes an LMS algorithm to both identify channel parameters and to smooth the received data signal to mitigate the effects of channel additive noise. In real time operation, the inventive equalizer first identifies the channel parameters in a training period. Thereafter, the same LMS algorithm is switched to smooth the received data signal, while intermittently, the LMS algorithm is switched back to track the slowly changing channel parameters. In comparison with the conventional LMS adaptive channel equalizer, the inventive dual mode channel equalizer achieves a significant performance improvement at little additional cost.

9 Claims, 3 Drawing Sheets

DUAL MODE LMS CHANNEL EQUALIZER

RELATED APPLICATIONS

The following applications contain subject matter related to the subject matter of the present application.
1. "Dual Mode LMS Nonlinear Data Echo Canceller" filed on even date herewith for Walter Y. Chen and Richard A. Haddad and bearing Ser. No. 438,598, now U.S. Pat. No. 4,977,591; and
2. "Noise Reduction Filter" filed on even date herewith for Walter Y. Chen and Richard A. Haddad and bearing Ser. No. 438,610.

The above-identified applications are assigned to the assignee hereof.

FIELD OF THE INVENTION

The present invention relates to a channel equalizer for improving the performance of data transmission over a regular telephone voice channel.

BACKGROUND OF THE INVENTION

The regular telephone voice channel has been used for digital data transmission since the early 1960's. The digital data is modulated onto a sine wave carrier signal whose frequency is within the voice band for transmission. The digital data is demodulated off the carrier signal after passing through the telephone channel. The device used to modulate digital data onto a carrier or demodulate digital data from a carrier is known as a modem. Three basic modulation techniques used by such modems are Amplitude Modulation, Frequency Modulation or Frequency Shift Keying, and Phase Modulation or Phase Shift Keying.

A regular telephone voice channel has a pass band from about 300 Hz to about 3300 Hz. However, the telephone voice channel is characterized by amplitude and phase deterioration at both the low and high frequency ends of this frequency band. The deterioration introduced by the telephone channel may make it difficult to confidently make a decision at a receiver as to the original transmitting value of a received signal. Accordingly, it is desirable to compensate for the undesirable frequency response characteristics of the voice telephone channel, so that an approximately flat frequency response is achieved across the voice pass band.

With some primary channel compensation techniques, such as compromise equalization, a regular telephone voice channel can transmit digital data at 1200 bits per second in full duplex, meaning two-way transmission at the same time.

A compromise equalizer is a transversal digital filter whose frequency response is the inverse of that of the average telephone channel. The use of the compromise equalizer in a modem brings a telephone voice channel one step closer to the desired flat voice band frequency response. However, since the frequency response of a particular telephone channel can differ very much from the average and varies with time, the compensation provided by the compromise equalizer is very limited.

The demand for higher transmission rates and the advancement of signal processing technology have led to the application of adaptive channel equalization. Adaptive channel equalization typically involves use of a digital filter with adaptive filter coefficients—i.e. a digital filter whose coefficients vary in time. An adaptive channel equalizer sets up its filter coefficients to model the inverse frequency response of a particular voice telephone channel at the beginning of a transmission session according to set of predetermined training data and keeps track of any channel variation thereafter by adaptively changing its filter coefficients. The adaptive channel equalizer's filter coefficients are set up according to each different individual telephone channel and any necessary changes are made continuously along with the variations of the particular telephone channel. Thus, the compensation provided by the adaptive channel equalizer is quite good. The adaptive channel equalizer has become a major component of high speed modems whose transmission rate is 2400 bits per second or higher.

The most commonly used adaptive signal processing algorithm for setting up filter coefficients and for keeping track of channel variations is the adaptive Least Mean Square (LMS) algorithm. The application of the LMS algorithm to the channel equalization problem is disclosed in R. W. Lucky, "Automatic Equalization for Digital Communication," *Bell System Tech.J.*, Vol. 44, pp. 547–588, April 1965. Based on the error between known training data and a received signal formed by transmitting the training data via a particular telephone channel, the LMS algorithm sets up filter coefficients according to an approximate gradient one small quantity at a time, so as to make the error as small as possible. The adaptive channel equalizer employing the LMS algorithm sufficiently reduces the error introduced into transmitted data by the telephone channel so that a confident decision can be made about the original transmitting value of a received signal. A significant advantage of using the LMS algorithm for channel equalization is that the LMS algorithm requires a relatively small amount of computation and can be easily implemented using a VLSI chip.

Thus, the use of an adaptive LMS channel equalizer can significantly increase usable channel capacity and make the high speed modem a reality. However, the initial convergence speed of an adaptive LMS channel is slow and the minimum Mean Square Error (MSE) is high for higher speed modems. With a conventional LMS adaptive channel equalizer, one has to trade a large MSE for a fast convergence time.

An important component of the MSE of a conventional LMS adaptive channel equalizer is the channel additive noise. The conventional LMS adaptive channel equalizer only identifies and tracks channel parameters but pays no attention to noise filtering.

Alternative adaptive signal processing algorithms for better channel equalization have been proposed: see e.g., J. M. Cioffi, "Fast Transversal Filter Applications for Communications Applications," Ph.D. Dissertation, Stanford University, 1984; B. Mulgrew and C. F. N. Cowan, "An Adaptive Kalman Equalizer: Structure and Performance," *IEEE Tran. on Acoust., Speech. Signal Processing*, Vol. ASSP-35, No. 12, pp. 1727–1735, December 1987; C. A. Belfior and J. H. Park, "Decision Feedback Equalization," *Proc. IEEE*, Vol. 67,(8), pp. 1143–1156, August 1979. However, these equalizers all require more computation power than the conventional LMS channel equalizer. The rapid convergence provided by the algorithms utilized in these equalizers is only required in the startup period when the filter coefficients are being set up. Once the filter coefficients characteristic of the inverse frequency response of a particular telephone channel are identified, the required speed to track the slowly time varying channel is much slower. Hence, the computation power of many fast algorithms is wasted in normal operation.

In view of the foregoing, it as an object of the present invention to provide an adaptive channel equalizer which overcomes the shortcomings of the conventional LMS channel equalizer, which is structurally simple, and which requires a minimum of computation power. More particularly, it is an object of the present invention to provide an adaptive channel equalizer which not only adaptively estimates the inverse frequency response of a particular telephone channel, but also smooths received data to reduce the effects of channel additive noise so as to achieve a smaller minimum mean square error or a faster convergence time.

SUMMARY OF THE INVENTION

The present invention is directed to a dual mode LMS channel equalizer. The inventive dual mode channel equalizer uses the same simple LMS algorithm as is used in the conventional LMS channel equalizer described above. However, the inventive channel equalizer not only identifies and tracks telephone channel parameters—i.e. filter coefficients characteristic of the inverse frequency response of the channel—but also smooths the received data signal to mitigate the effects of channel additive noise. Because the effective noise level in the received data is reduced by the smoothing process a better set of channel parameters is identified. The improved performance can be translated into either a smaller squared estimation error or a faster initial convergence speed.

Because the variation in time of the channel parameters is relatively slow, both the channel parameter identification task and the data smoothing task share the same simple LMS algorithm in the channel equalizer of the present invention. Hence, in comparison to the conventional LMS adaptive channel equalizer, the inventive dual mode LMS adaptive channel equalizer provides a significant performance improvement with little additional cost.

In real time operation, the inventive channel equalizer first performs the channel identification task in a training period. Thereafter, the same LMS algorithm is switched to smooth the received data signal, while intermittently, the LMS algorithm is switched back to track the slowly changing channel parameters.

DETAILED DESCRIPTION OF THE INVENTION

The Detailed Description of the Invention is divided into the following subsections. Subsection A describes a conventional LMS adaptive channel equalizer. Subsection B describes the inventive dual mode LMS channel equalizer. Subsection C compares the performance of the conventional LMS adaptive channel equalizer and the inventive dual mode LMS channel equalizer.

A. Conventional LMS Adaptive Channel Equalizer

Figure 1:
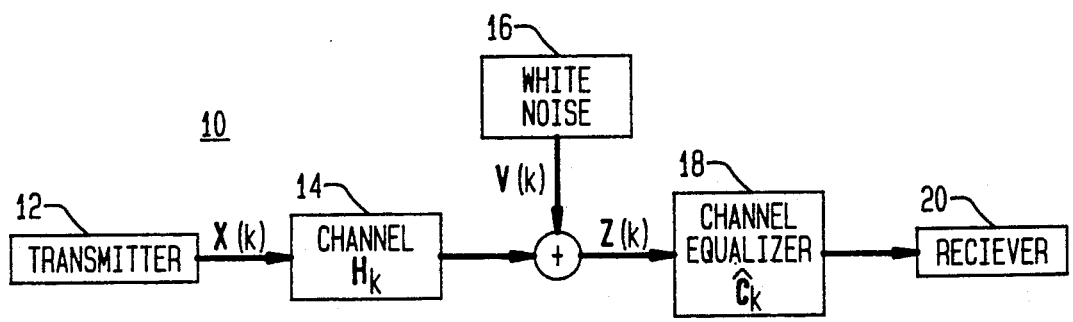
FIG 1 schematically illustrates a conventional telephone voice channel used for data transmission.

A system 10 used for the transmission of digital data via a telephone voice channel is illustrated in FIG. 1. The signal to be transmitted is represented by X(k). where k=0,1,2... represents the discrete time variable. The signal X(k) is modulated onto a sine wave carrier by the transmitter 12 which illustratively forms part of a modem (not shown).

The signal X(k) is then transmitted via a voice telephone channel represented in FIG. 1 by the box 14. The channel impulse response (i.e. frequency response to an impulse driving signal) at the time k may be represented by the vector $$H_k = \begin{bmatrix} h_1 \\ h_2 \\ \cdot \\ \cdot \\ \cdot \\ h_n \end{bmatrix}_k \tag{1}$$

In addition, the signal X(k) is degraded by additive channel noise v(k). In FIG. 1, the noise generation is represented by the box 16.

Thus, the signal Z(k) which arrives at the channel equalizer 18 is degraded in two ways. One source of degradation results from the slowly changing impulse response $H_k$ of the channel 14 and another source of degradation is the additive channel noise V(k).

It is the role of the channel equalizer 18 to process the arriving signal values Z(k) so that a confident decision can be made at the receiver 20 as to the original transmitted signal values X(k).

The conventional LMS adaptive channel equalizer processes the arriving signal Z(k) to compensate for the time variable frequency response of the channel, but does not compensate for the channel additive noise V(k).

The impulse response of the channel equalizer at the time k is represented by the vector $$\hat{C}_k = \begin{bmatrix} \hat{c}_1 \\ \cdot \\ \cdot \\ \cdot \\ \hat{c}_n \end{bmatrix}_k \tag{2}$$

The vector $\hat{C}_k$ is an estimate of the inverse channel impulse response. The values $\hat{c}_{1,k} \ldots \hat{c}_{n,k}$ may be viewed as the filter coefficients of an adaptive digital filter comprising the channel equalizer 18.

The conventional adaptive channel equalizer utilizes the following LMS algorithm to estimate $\hat{C}_{k+1}$:

$$\hat{C}_{k+1} = \hat{C}_k + \mu Z_k (X(k) - Z_k^T \hat{C}_k) \tag{3}$$

where $Z_k$ is a received signal vector made up of the current and previous n−1 received signal values, i.e.

$$Z_k = \begin{bmatrix} Z(k) \\ Z(k-1) \\ \vdots \\ Z(k-n+1) \end{bmatrix} \qquad (4)$$

and where
$$\hat{C}_o = 0 \qquad (5)$$
$$Z_o = 0$$

Normally the values X(k) are not available to the channel equalizer which executes the algorithm of Eq(3). To the contrary, in normal operation it is the role of the channel equalizer to provide as an output the values X(k) based on the received signal values Z(k).

During a training period the vector $\hat{C}_k$ is set up using known training X(k)'s. After the channel equalizer converges to a minimum mean square error using the training X(k)'s, the channel equalizer switches to normal operation wherein the values X(k) are not available.

To reconstruct the originally transmitted X(k)'s from the actually received Z(k)'s, the virtual match function is utilized. First, the quantity $$\hat{C}_k^T Z_k = Z_k^T \hat{C}_k \qquad (6)$$

is formed. This operation compensates for the effect of the channel frequency response on the received signals Z(k). During an iteration k, to obtain a value X(k) from a quantity $\hat{C}_k^T \cdot Z_k$, a decision block which stores all possible values of X(k) is utilized. For any given iteration, k, of the algorithm of Equation 3, X(k) is taken as the value stored in the decision block which is closest to $\hat{C}_k^T Z_k$.

Figure 2:
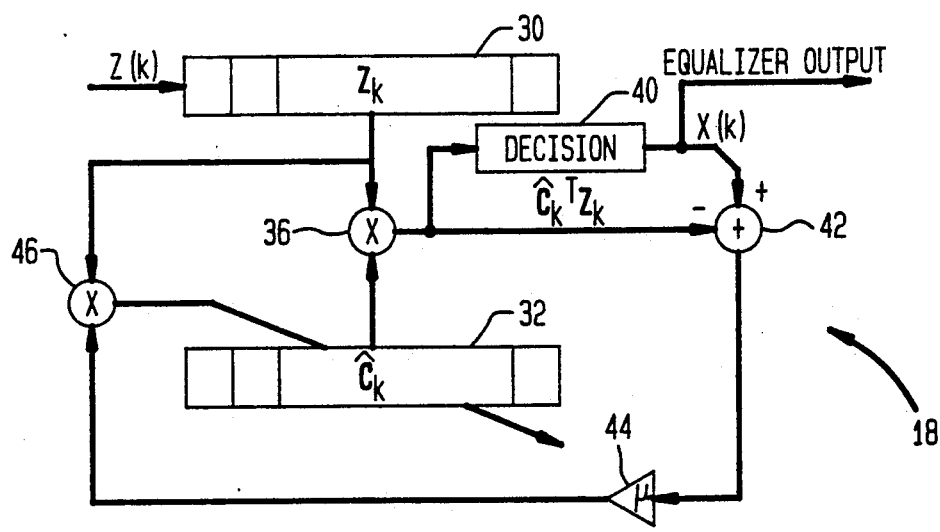
FIG. 2 schematically illustrates a conventional LMS adaptive channel equalizer for use in the telephone voice channel of FIG 1.

FIG. 2 schematically illustrates a conventional LMS adaptive channel equalizer 18. The inputs to the channel equalizer are the received signal values Z(k). The outputs from the channel equalizer are the originally transmitted values X(k). The channel equalizer 18 as shown in FIG. 2 comprises one shift register 30 and one non-shift register 32. The shift register 30 stores the values comprising the received signal vector $Z_k$. The non-shift register 32 stores the filter coefficients which make up the estimated inverse channel impulse response $\hat{C}_k$. To obtain the value X(k) during the $k^{th}$ iteration, the multiplier 36 is used to form the quantity $\hat{C}_k^T Z_k$. This quantity is then transmitted to the decision block 40 which performs the virtual match function described above to obtain a signal value X(k). The estimated inverse channel impulse response is then updated, i.e. the quantity $\hat{C}_{k+1}$ is then formed, by first using the subtraction unit 42 to form the error quantity $X(k) - \hat{C}_k^T Z_k$. This error quantity is then multiplied by the adaptation step size $\mu$ using the unit 44 and multiplied by the vector quantity $Z_k$ using the multiplier unit 46. The resulting vector quantity $\mu Z_k (X(k) - \hat{C}_k^T Z_k)$ is then added to $\hat{C}_k$ to form $\hat{C}_{k+1}$.

The performance of a channel equalizer, such as the conventional LMS adaptive channel equalizer described above, is usually judged according to its mean square error (MSE). The mean square error level is given by $$\xi_k = E[X(k) - \hat{C}_k^T Z_k]^2 \qquad (7)$$

where E[x] is the expectation value of x. Thus the MSE depends on the difference between the original transmitted signal value X(k) and the signal value obtained by compensating the received signal for the frequency response of the channel as indicated by $\hat{C}_k^T Z_k$.

The mean square error of an adaptive LMS channel equalizer decreases as the number of iterations, k, increases, until a minimum MSE level is reached. As indicated above, the conventional adaptive LMS channel equalizer's MSE level is usually brought down to the minimum during the startup or training period. The minimum MSE level is related to the tap length n of the channel equalizer and the adaptation step size $\mu$. A large minimum MSE is expected if the tap length of the channel equalizer is not long enough to cover the inverse channel impulse response which generally is a finite impulse response. A large step size $\mu$ also causes a high MSE level, provided that $\mu$ is still small enough to make the LMS algorithm stable. The step size $\mu$ will also affect the initial convergence time, i.e. the number of iterations required to bring the MSE down to its minimum.

Thus, as indicated above, the use of a conventional LMS adaptive channel equalizer can significantly increase the capacity of a telephone voice channel for digital data transmission and make the high speed modem a reality. However, at least in part because the conventional LMS adaptive channel equalizer fails to treat the channel additive noise V(k), the conventional LMS equalizer has a high MSE for high speed modems and a slow convergence speed.

B. Dual Mode LMS Channel Equalizer

As indicated above, the present invention is a channel equalizer which utilizes the LMS algorithm to both smooth the received signal Z(k) to mitigate the effects of channel additive noise V(k) and to estimate the inverse channel impulse response.

Figure 3:
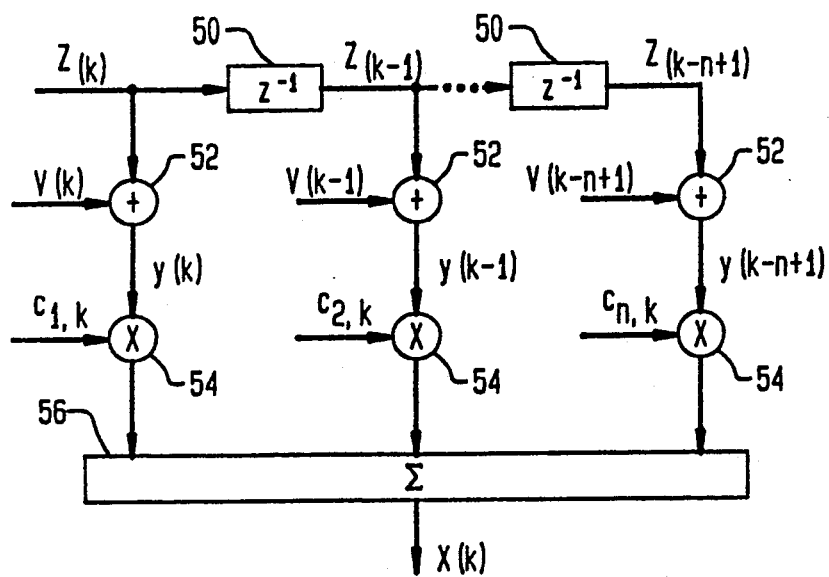
FIG. 3 schematically illustrates the task to be performed by the inventive dual mode LMS channel equalizer.

In principal, it is desirable for the channel equalizer to perform the operations illustrated in FIG. 3, where the Z(k)'s are the received signal values with additive channel noise, the Y(k)'s represent the smoothed received signal and the $C_{i,k}$'s represent the inverse channel impulse response.

In particular, as shown in FIG. 3

$$Y(k) = Z(k) - V(k) \qquad (8)$$

and $$X(k) = \Sigma C_{i,k} Y(k-i+1) \qquad (9)$$

Thus, a two-step process is used to obtain the value X(k) for each such iteration k. First, the subtraction units 52 are used to subtract the channel additive noise values v(k), v(k−1) ... v(k−1+1) from the received signal values Z(k), Z(k−1) ... Z(k−n+1), to obtain the smoothed signal values Y(k), Y(k−1) ... Y(k−n+1) (It should be noted that in FIG. 3, the boxes 50 represent unit delays.) The values Y(k), Y(k−1) ... Y(k−n+1) may be viewed as forming a smoothed signal vector Yk.

After, the smoothed signal vector Yk is obtained by subtracting the channel additive noise, it is then necessary to compensate for the frequency response of the channel. The inverse channel impulse response is represented by the filter coefficients $c_{1,k}, C_{2,k} \ldots C_{n,k}$ which form the vector $C_k$. To obtain the value X(k) the multipliers 54 and summation unit 56 are used to perform the operation $$X(k) = \sum_i \hat{C}_{i,k} Y(k - i + 1) = C_k^T Y_k \qquad (10)$$

In reality, however, neither the channel additive noise signal values V(k) nor the time variable inverse channel impulse response $C_k$ are known. Thus, the present invention utilizes the LMS algorithm to obtain an estimate $\hat{C}_k$ for the vector $C_k$. In addition, the present invention utilizes the LMS algorithm to estimate the smoothed received signal vector $Y_k$. More particularly, the present invention utilizes a prior prediction or estimate $\hat{Y}_{k/k-1}$ and the LMS algorithm to form an updated estimate $\hat{Y}_{k/k}$. (Note that the notation $Y_{k/k-1}$ means a prediction or estimate of $Y_k$ made during the (k−1)th iteration of the LMS algorithm). In short the channel equalizer of the present invention is known as a dual mode LMS channel equalizer because the LMS algorithm performs two roles: it serves to smooth the receive data signal to mitigate the effects of the additive channel noise (i.e. estimate the vector $Y_k$) and estimate the inverse channel impulse response (i.e. estimate the vector $C_k$).

The operation of the dual mode LMS channel equalizer of the present invention is divided into a startup training phase and a dual mode phase.

The operation for the startup phase is the same as that of a conventional LMS channel equalizer. The channel equalizer obtains an estimate $\hat{C}_k$ of the inverse channel impulse response $C_k$ by executing the following expression based on known training X(k)'s.

$$\hat{C}_{k+1} = \hat{C}_k + \mu Z_k(X(k) - Z_k^T \hat{C}_k) \qquad (11)$$

with the initial value $\hat{C}_0 = 0$.
As indicated above, $$Z_k = \begin{bmatrix} Z(k) \\ Z(k-1) \\ \cdot \\ \cdot \\ \cdot \\ Z(k-n+1) \end{bmatrix} \qquad (12)$$

The vector $Z_k$ may also be written as $$Z_k = F Z_{k-1} + G Z(k) \qquad (13)$$

where $$F = \begin{bmatrix} 0 & \ldots & & & 0 \\ 1 & 0 & \ldots & & 0 \\ 0 & 1 & \ldots & & 0 \\ 0 & \ldots & & 0 & 1 & 0 \end{bmatrix} \qquad (14)$$

and $$G = \begin{bmatrix} 1 \\ 0 \\ \cdot \\ \cdot \\ \cdot \\ 0 \end{bmatrix} \qquad (15)$$

The purpose of the shift matrix F and the matrix G is to construct a new received signal vector $Z_k$ from the previous received signal vector $Z_{k-1}$ and the new received signal value Z(k).

When $k = n_c$, after the inverse channel response has been estimated and the channel equalizer reaches an MSE level determined by the channel additive noise, the dual mode channel equalizer begins to operate in the dual mode phase.

In the dual mode phase, the channel equalizer normally executes the following smoothed received signal vector estimation operation while allowing the estimated inverse channel impulse response to remain unchanged:

$$\hat{Y}_{k+1/k+1} = \hat{Y}_{k+1/k} + \beta \hat{C}_k (X(k) - \hat{C}_k^T \hat{Y}_{k+1/k}) \qquad (16)$$

$$\hat{C}_{k+1} = \hat{C}_k \qquad (18)$$

$$\hat{Y}_{k+1/k} = F \hat{Y}_{k/k} + G Z(k) \qquad (18)$$

In equation (16), the virtual match function is used to obtain X(k) from $C_k^T Y_{k+1/k}$.

When k equals a multiple of M in the dual mode phase, the echo canceller updates the estimated inverse channel impulse response by executing the following expressions:

$$\hat{C}_{k+1} = \hat{C}_k + \mu \hat{Y}_{k/k}(X(k) - \hat{Y}_{k/k}^T \hat{C}_k) \qquad (19)$$

$$\hat{Y}_{k+1/k+1} = F \hat{Y}_{k/k} + G Z(k) \qquad (20)$$

Generally, M should be small enough such that the adaptive channel tracking process can catch up with any slow channel variation. In addition, M should not be too small such that the received data signal smoothing operation can still be properly carried out even though the operation is skipped once every $M^{th}$ cycle. Typically, M is on the order of the tap length n of the channel equalizer. Illustratively, the tap length is n=11.

Figure 4:
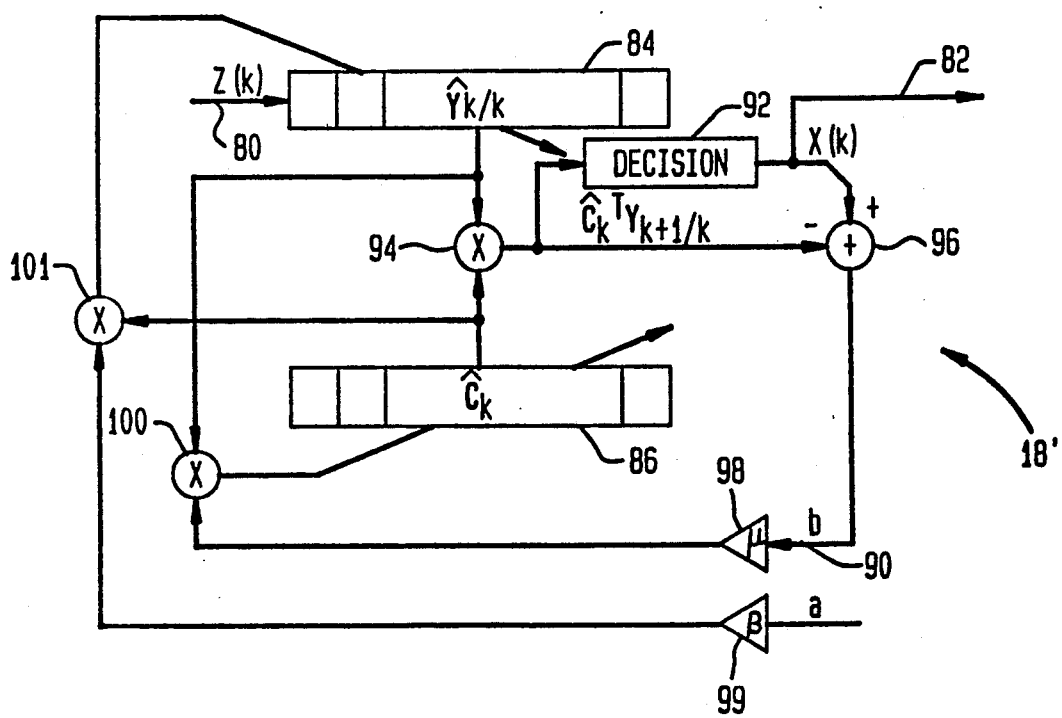
FIG. 4 schematically illustrates a dual mode LMS channel equalizer in accordance with a illustrative embodiment of the present invention.

FIG. 4 schematically illustrates a circuit implementation of a dual mode LMS channel equalizer 18'. The inputs to the channel equalizer 18' are the received signal values Z(k) on line 80. The outputs of the channel equalizer 18' on line 82 are the reconstructed original transmitted signal values X(k).

The channel equalizer 18' contains one shift register 84 and one non-shift register 86. The received signal values Z(k) enter the shift register 84 on line 80.

The channel equalizer 18' of FIG. 4 also contains a switch mechanism 90. When the switch mechanism 90 is in the position b, the channel equalizer performs the inverse channel impulse response estimation task. When the switch mechanism 90 is in the position a, the smoothed received signal vector estimation task is performed.

During the training period, when the operation of equation (11) is carried out, the switch mechanism 90 is in position b and the received signal vector $Z_k$ is stored in the shift register 84. Known training values of the signal X(k) are supplied (rather than using the decision unit 92 to reconstruct values of X(k) using the virtual match function). The multiplier unit 94, the subtraction unit 96, the scaler-multiplier 98, and the multiplier unit 100 are used to carry out the operation of equation (11) to obtain a primary estimate of the inverse channel impulse response $\hat{C}_k$. The unit 98 supplies the adaptation step size $\mu$.

As indicated above, when $k = n_c$ the channel equalizer switches operation to the dual mode phase. Normally, during the dual mode phase, the switch mechanism 90 is in position a and the smoothed received signal vector estimation task is performed. In this case the shift register 84 stores the estimated smoothed received signal vector $Y_{k/k}$. The values $Z(k)$ enter the shift register 84 at the left hand side thereof and the values $Z(k)$ are shifted one position to the right during each iteration while being smoothed to form the vector $Y_{k/k}$ using the operation of equation (16). The operation of equation (16) is carried out using the multiplier unit 94, the subtraction unit 96, the scaler-multiplier unit 99 and the multiplier unit 101. The scaler multiplier unit 99 supplies the adaptation step size $\beta$. During the dual mode phase, when the iteration number k is a multiple of M, the switch mechanism 90 switches to position b to update the inverse channel frequency response by carrying out the operation of equation (19).

C. Performance Comparison

In comparison to a conventional LMS adaptive channel equalizer, the inventive dual mode LMS channel equalizer can be used to achieve either a smaller minimum MSE or a faster convergence time.

For example, consider an illustrative simulated transmission channel whose signal-to-noise ratio is 20 dB. With an adaptation step size $\mu$ set equal to 0.075, the conventional LMS adaptive channel equalizer achieves a minimum MSE level of approximately $10^{-2}$. A dual mode channel equalizer with the same value for $\mu$ and with a value of $\beta$ (the adaptation step size for the signal smoothing task) set equal to 0.5, achieves a minimum MSE level of about $10^{-2.4}$. This minimum MSE level could be achieved using the conventional LMS channel adaptive channel equalizer only in a system with a signal-to-noise ratio of 25 dB. Thus, the inventive dual mode channel equalizer achieves a 5 dB signal-to-noise improvement.

In the foregoing example, the dual mode adaptive channel equalizer was used to achieve a smaller minimum MSE level. Alternatively, by using a larger value for $\mu$, the dual mode LMS channel equalizer can be used to achieve a faster convergence time. Consider an illustrative simulated transmission channel with a signal-to-noise ratio of 30 dB. The conventional LMS channel equalizer with an adaptation step size $\mu$ of 0.025 has a residual squared error of $10^{-3.3}$ and converges in about 400 iterations. In contrast, the inventive dual mode channel equalizer with an adaptation step size $\mu$ set equal to 0.075 and a signal smoothing adaptation step size $\mu$ set equal to 0.3, achieves a residual squared error of $10^{-3.4}$ but requires only 150 iterations to converge.

Figure 5:
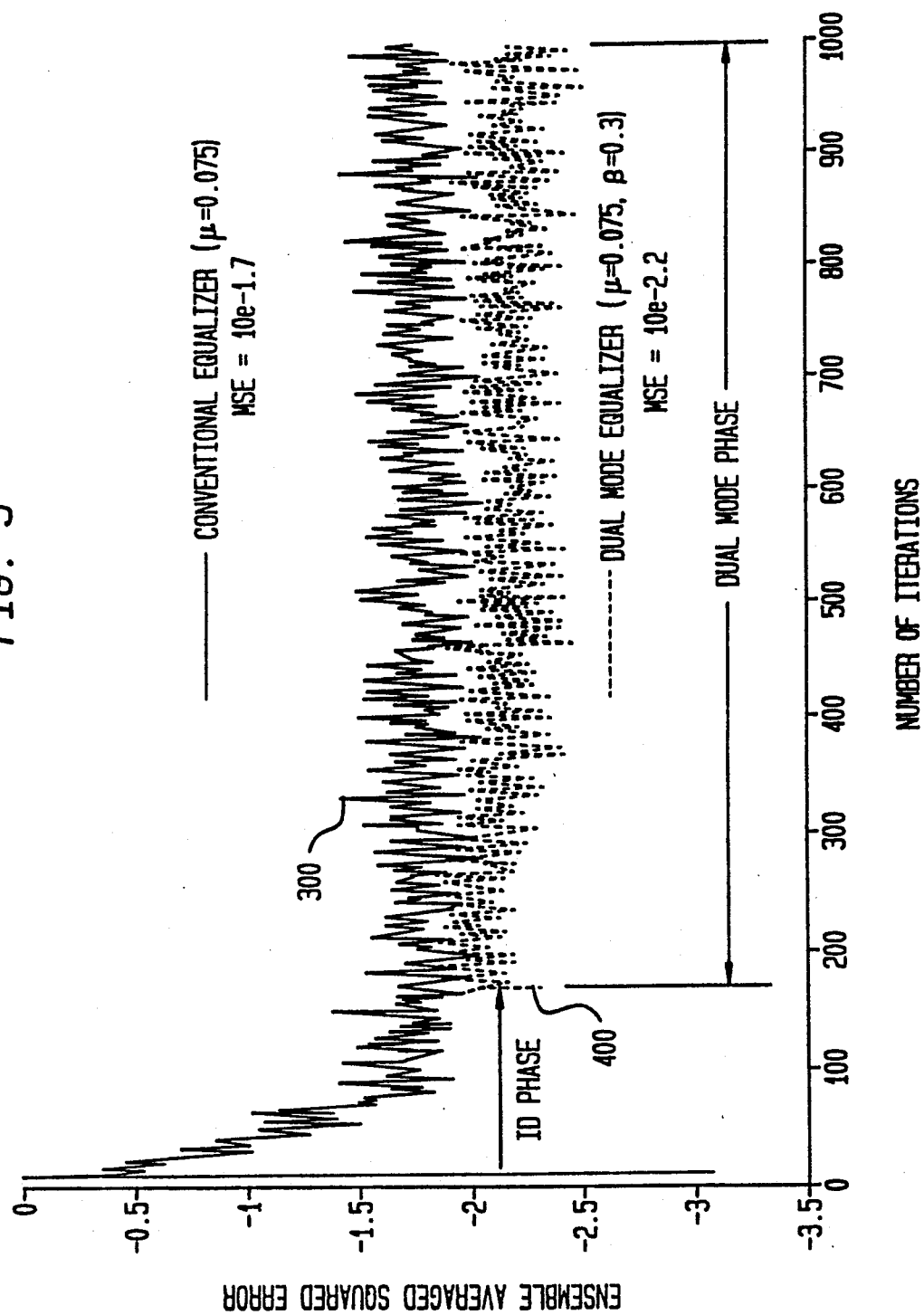
FIG. 5 compares the performance of a conventional LMS adaptive channel equalizer and the inventive dual mode LMS channel equalizer.

FIG. 5 illustrates the performance of conventional LMS adaptive channel equalizer and the performance of the inventive dual mode channel equalizer for a model AT&T telephone channel (see e.g., K. Abend and B. D. Fritchman, "Statistical Detection for Communication Channels With Intersymbol Interference," *Proc. IEEE*, Vol. 158, pp. 779–785) with a signal-to-noise ratio of 20 dB. In FIG. 5, the abscissa plots the number of iterations and the ordinate plots the mean square error on a logarithmic scale.

Curve 300 plots the mean square error of a conventional LMS channel equalizer with an adaptation step size $\mu$ set equal to 0.075 as a function of the number of iterations. The channel equalizer converges to a minimum mean square error of $10^{-1.7}$ in about 200 iterations. Curve 400 plots the mean square error of a dual mode channel equalizer with $\mu=0.075$ and $\beta=0.3$ as a function of the number of iterations. The startup or training phase and the dual mode phase are indicated in FIG. 5. As indicated in FIG. 5, the startup or training phase is about 200 iterations. The mean square error during the dual mode phase is about $10^{-2.2}$ which is significantly lower than the mean square error of the conventional LMS adaptive channel equalizer.

CONCLUSION

A dual mode channel equalizer for improving the transmission of digital data over the regular telephone voice channel has been disclosed. The dual mode channel equalizer uses an LMS algorithm to smooth a received data signal to compensate for additive channel noise and to estimate the inverse channel impulse response to compensate for the frequency response of the channel.

Finally, the above-described embodiments of the invention are intended to be illustrative only. Numerous alternative embodiments may be devised by those skilled in the art without departing from the spirit and scope of the following claims.

We claim:

1. A channel equalizer for reconstructing original signal values X(k) transmitted via a channel from received signal values Z(k) comprising
   means utilizing an LMS algorithm for estimating smoothed received signal values Y(k) to compensate for the effect of additive noise V(k) of said channel in said received signal values Z(k),
   means utilizing an LMS algorithm for estimating the inverse impulse response of said channel, and
   means for reconstructing the original transmitted signal values X(k) from the estimated smoothed received signal values Y(k) by utilizing the estimated inverse impulse response to compensate for the frequency response of the channel.

2. The channel equalizer of claim 1 wherein said reconstructing means includes means for implementing a virtual match function.

3. A channel equalizer for equalizing a telecommunications channel used for the transmission of digital data comprising
   means for smoothing a digital signal transmitted via said channel by applying a least mean square algorithm to mitigate the effects on the transmitted digital signal of channel additive noise and for maintaining as constant estimated parameters characterizing the inverse impulse response of said channel, and
   means operative intermittently for updating said estimated parameters by applying a least means square algorithm and for maintaining as constant signal values produced by said smoothing means.

4. The channel equalizer of claim 3 wherein said channel is a regular voice telephone channel.

5. A method of equalizing a telecommunications channel used for the transmission of digital data comprising the steps of
   utilizing a channel equalizer to smooth a digital signal transmitted via said channel by using a least mean square algorithm to mitigate the effects on the transmitted digital signal of additive channel noise while estimated parameters characterizing the inverse impulse response of said channel are held constant by said channel equalizer, and
   intermittently, using a least means square algorithm to update said estimated parameters while signal values produced as a result of said smoothing step are maintained as constant by said channel equalizer.

6. The method of claim 5 wherein prior to said smoothing step, an LMS algorithm and known training signals are used to obtain a primary estimate of said parameters characterizing the inverse channel impulse response.

7. A method for equalizing a telecommunications channel comprising the steps of:

during a training period, utilizing a least means square algorithm to estimate an inverse channel impulse response, and thereafter, during a dual phase period, utilizing said estimated inverse channel impulse response and said least mean square algorithm to smooth a data signal transmitted via said channel to compensate for channel additive noise, and intermittently, using said least mean square algorithm to update said estimated inverse channel impulse response.

8. The method of claim 7 wherein said least mean square algorithm utilizes a first adaptation step size $\alpha$ to estimate said inverse channel impulse response and a second adaptation step size $\beta$ to smooth the data signal.

9. The method of claim 7 wherein said method further comprises the step of utilizing a virtual match function to reconstruct said data signal.

* * * * *